United States Patent
Ishikawa et al.

(10) Patent No.: US 11,954,480 B2
(45) Date of Patent: Apr. 9, 2024

(54) CENTER, OTA MASTER, SYSTEM, METHOD, NON-TRANSITORY STORAGE MEDIUM, AND VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 17/663,674

(22) Filed: May 17, 2022

(65) Prior Publication Data

US 2022/0405082 A1  Dec. 22, 2022

(30) Foreign Application Priority Data

Jun. 22, 2021 (JP) .................................. 2021-103271

(51) Int. Cl.
*G06F 8/65* (2018.01)
(52) U.S. Cl.
CPC ............ *G06F 8/65* (2013.01); *B60W 2556/45* (2020.02)
(58) Field of Classification Search
CPC .............................. G06F 8/65; B60W 2556/45
See application file for complete search history.

(56) References Cited

U.S. PATENT DOCUMENTS

| 2012/0197481 A1* | 8/2012 | Takeda ................... G07C 5/085 701/32.7 |
| 2015/0301822 A1* | 10/2015 | Takahashi ............ B60R 16/023 717/173 |
| 2020/0401396 A1* | 12/2020 | Oh .......................... G06F 8/658 |
| 2021/0092025 A1* | 3/2021 | Ukai ................. H04L 12/40026 |
| 2022/0179644 A1* | 6/2022 | Harata ..................... G06F 8/65 |

FOREIGN PATENT DOCUMENTS

JP  2004-326689 A  11/2004

* cited by examiner

*Primary Examiner* — Ziaul A Chowdhury
(74) *Attorney, Agent, or Firm* — Oblon, McClelland, Maier & Neustadt, L.L.P.

(57) ABSTRACT

A center comprising one or more processors configured to: communicate with an OTA master configured to control, based on update data, a software update for a plurality of electronic control units mounted on a vehicle; transmit, to the OTA master, first-type update data that is the update data for a first electronic control unit on which a first-type non-volatile memory having one storage area is mounted and second-type update data that is the update data for a second electronic control unit on which a second-type non-volatile memory having two storage areas is mounted, the first electronic control unit and the second electronic control unit being included in the electronic control units; and control transmittance of the first-type update data and the second-type update data to the OTA master based on a communication state between the center and the OTA master.

6 Claims, 8 Drawing Sheets

FIG. 7

| ECU ID | MEMORY TYPE |
|---|---|
| aaaa | SECOND TYPE (DUAL BANK) |
| bbbb | SECOND TYPE (DUAL BANK) |
| cccc | FIRST TYPE (SINGLE BANK) |
| dddd | FIRST TYPE (SINGLE BANK) |
| ... | ... |

CENTER, OTA MASTER, SYSTEM, METHOD, NON-TRANSITORY STORAGE MEDIUM, AND VEHICLE

CROSS-REFERENCE TO RELATED APPLICATION

This application claims priority to Japanese Patent Application No. 2021-103271 filed on Jun. 22, 2021, incorporated herein by reference in its entirety.

BACKGROUND

1. Technical Field

The present disclosure relates to a center, an OTA master, a system, a method, a non-transitory storage medium, and a vehicle.

2. Description of Related Art

A plurality of electronic control units used for controlling an operation of a vehicle is mounted on the vehicle. The electronic control unit includes a processor, a transitory storage unit, such as a random access memory (RAM), and a non-volatile memory which is a non-volatile storage unit, such as a flash read-only memory (ROM). A control function of the electronic control unit is implemented when the processor executes software stored in the non-volatile memory. Software stored in each electronic control unit is rewritable, and by updating to a newer version of the software, it is possible to improve a function of each electronic control unit or add a new vehicle control function.

An over-the-air (OTA) technology is known as a technology for updating software of an electronic control unit. In the OTA technology, a device that wirelessly connects an in-vehicle communication device connected to an in-vehicle network to a communication network, such as the Internet, and executes software update processing of the vehicle updates or adds the software of the electronic control unit by downloading software from a server via wireless communication and installing the downloaded software on the electronic control unit (see, for example, Japanese Unexamined Patent Application Publication No. 2004-326689).

As types of non-volatile memories mounted on the electronic control units, there are a memory (a single-bank memory) having one storage area used for storing data, such as software, and a memory (a dual-bank memory) having two storage areas used for storing data, such as software. The non-volatile memories may be properly used according to specifications or the like of the electronic control units. An electronic control unit having the dual-bank memory mounted thereon can store two versions of data, old and new, in the two storage areas, respectively.

SUMMARY

In a campaign, which is an event for updating software for vehicles, there is a case where both an electronic control unit having a single-bank memory mounted thereon and an electronic control unit having a dual-bank memory mounted thereon are electronic control units of which software is to be updated. Due to structures of the memories, the electronic control unit having the single-bank memory mounted thereon and the electronic control unit having the dual-bank memory mounted thereon have different recovery methods when the update fails.

For this reason, when applying, to a vehicle, a campaign in which the electronic control unit having the single-bank memory mounted thereon and the electronic control unit having the dual-bank memory mounted thereon are mixed as the electronic control units of which the software is to be updated, it is required to execute download and installation in consideration of different structures of the memories mounted on the electronic control units of which the software is to be updated.

The present disclosure provides a center, an OTA master, a system, a method, a non-transitory storage medium, and a vehicle that can execute a software update adapted to a single-bank memory and a dual-bank memory.

A center according to a first aspect of the present disclosure includes one or more processors configured to: communicate with an OTA master configured to control, based on update data, a software update for a plurality of electronic control units mounted on a vehicle; transmit, to the OTA master, first-type update data that is the update data for a first electronic control unit on which a first-type non-volatile memory having one storage area is mounted and second-type update data that is the update data for a second electronic control unit on which a second-type non-volatile memory having two storage areas is mounted; and control transmittance of the first-type update data and the second-type update data to the OTA master based on a communication state between the center and the OTA master. The first electronic control unit and the second electronic control unit are included in the electronic control units.

An OTA master according to a second aspect of the present disclosure includes one or more processors configured to: receive, from a center, first-type update data for a first electronic control unit on which a first-type non-volatile memory having one storage area is mounted and second-type update data for a second electronic control unit on which a second-type non-volatile memory having two storage areas is mounted; and control reception of the first-type update data and the second-type update data from the center based on a communication state between the center and the OTA master. The first electronic control unit and the second electronic control unit are included in a plurality of electronic control units mounted on a vehicle, and the first-type update data and the second-type update data are update data based on which software update for the electronic control units is controlled A system according to a third aspect of the present disclosure includes: an over-the-air (OTA) master including one or more first processors configured to control, based on update data, a software update for a plurality of electronic control units mounted on a vehicle; and a center including one or more second processors configured to communicate with the OTA master, transmit, to the OTA master, first-type update data that is the update data for a first electronic control unit on which a first-type non-volatile memory having one storage area is mounted and second-type update data that is the update data for a second electronic control unit on which a second-type non-volatile memory having two storage areas is mounted, and control transmittance of the first-type update data and the second-type update data to the OTA master based on a communication state between the center and the OTA master. The one or more first processors are configured to receive the first-type update data and the second-type update data transmitted by the center. The first electronic control unit and the second electronic control unit are included in the electronic control units.

A method according to a fourth aspect of the present disclosure is executed by a center configured to communicate with an OTA master that includes one or more processors and one or more memories and is configured to control, based on update data, a software update for a plurality of electronic control units mounted on a vehicle. The method includes: transmitting, to the OTA master, first-type update data that is the update data for a first electronic control unit on which a first-type non-volatile memory having one storage area is mounted and second-type update data that is the update data for a second electronic control unit on which a second-type non-volatile memory having two storage areas is mounted; and controlling transmittance of the first-type update data and the second-type update data to the OTA master based on a communication state between the center and the OTA master. The first electronic control unit and the second electronic control unit are included in the electronic control units the first electronic control unit and the second electronic control unit being included in the electronic control units.

A non-transitory storage medium according to a fifth aspect of the present disclosure stores instructions that are executable by a computer of a center configured to communicate with an OTA master which includes one or more processors and one or more memories and is configured to control a software update of an electronic control unit mounted on a vehicle, and that cause the computer to execute the method according to the fourth aspect.

A vehicle according to a sixth aspect of the present disclosure includes the OTA master according to the second aspect.

With each aspect of the present disclosure, it is possible to appropriately execute, based on a communication state between a center and a vehicle (an OTA master), a software update (download) for a vehicle on which both a single-bank memory and a dual-bank memory are mounted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a diagram illustrating an example of type information;

DETAILED DESCRIPTION OF EMBODIMENTS

A network system of the present disclosure downloads, based on a communication state between a center and a vehicle, update data appropriate for a memory type (a single-bank memory/a dual-bank memory) included in an electronic control unit (ECU) to be updated. By this processing, it is possible to reduce a time required for normally starting the ECU after the software update. Hereinafter, one embodiment of the present disclosure will be described in detail with reference to drawings.

Embodiments

Configuration

Figure 1:
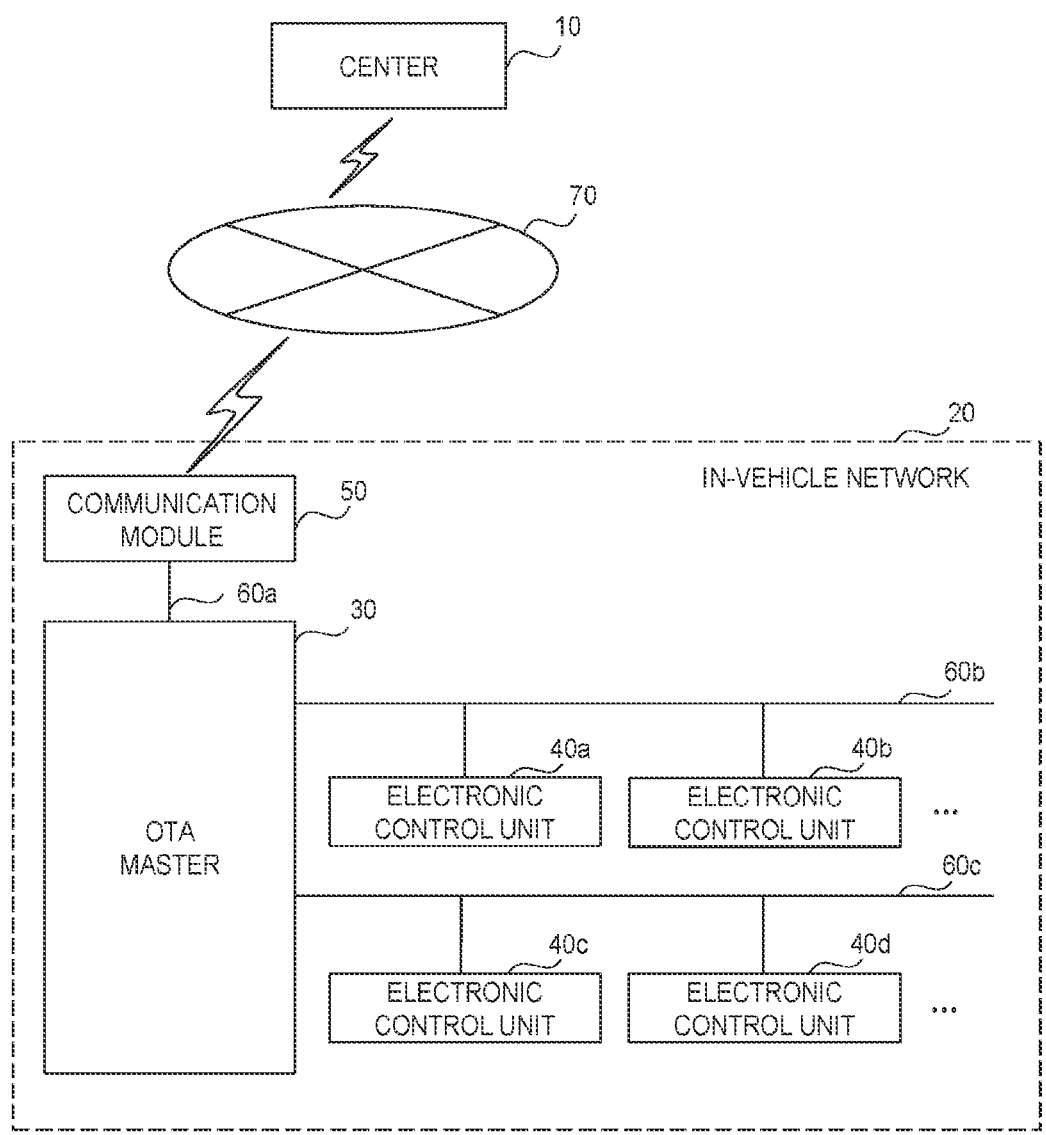
FIG. 1 is a block diagram illustrating an overall configuration of a network system according to an embodiment.

FIG. 1 is a block diagram illustrating an overall configuration of a network system according to one embodiment of the present disclosure. The network system illustrated in FIG. 1 is used for updating software of a plurality of ECUs 40a to 40d mounted on a vehicle, and includes a center 10 outside the vehicle and an in-vehicle network 20 constructed inside the vehicle.

(1) Center

The center 10 can communicate with an OTA master 30 (described below) included in the in-vehicle network 20, via a network 70. The center 10 can control and manage the software update for the ECUs 40a to 40d connected to the OTA master 30 by transmitting the update data of the pieces of the software of the ECUs 40a to 40d, receiving a notification indicating a proceeding state of software update processing, or the like, to and from the OTA master 30. The center 10 functions as a so-called server.

Figure 2:
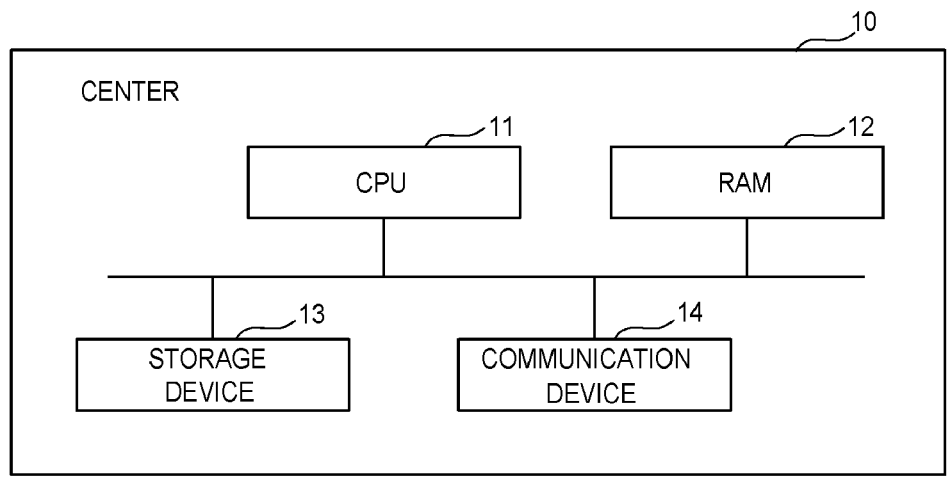
FIG. 2 is a block diagram illustrating a schematic configuration of a center.

FIG. 2 is a block diagram illustrating a schematic configuration of the center 10 in FIG. 1. As illustrated in FIG. 2, the center 10 includes a central processing unit (CPU) 11, a random access memory (RAM) 12, a storage device 13, and a communication device 14. The numbers of the CPUs 11, RAMs 12, storage devices 13, and communication devices 14 are not respectively limited to one. The storage device 13 includes a readable and writable storage medium, such as a hard disk drive (HDD) or a solid state drive (SSD), and stores a program used for executing software update management, information used for software update control and the software update management, update data of software of each ECU, and the like. In the center 10, the CPU 11 executes predetermined processing for the software update by executing a program read from the storage device 13 using the RAM 12 as a work area. The communication device 14 is used for communicating with the OTA master 30 via the network 70.

Figure 3:
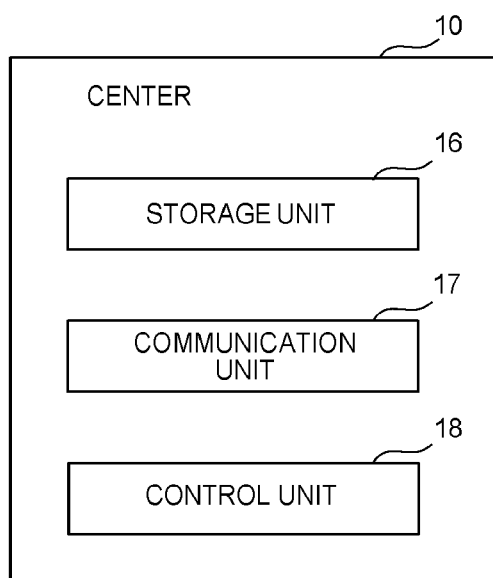
FIG. 3 is a functional block diagram of the center.

FIG. 3 is a functional block diagram of the center 10 illustrated in FIG. 2. The center 10 illustrated in FIG. 3 includes a storage unit 16, a communication unit 17, and a control unit 18. A function of the storage unit 16 is implemented by the storage device 13 illustrated in FIG. 2. Functions of the communication unit 17 and the control unit 18 are implemented when the CPU 11 illustrated in FIG. 2 executes a program stored in the storage device 13 using the RAM 12.

The storage unit 16 stores information on the software update processing of one or more ECUs mounted on the vehicle. As the information on the software update processing, the storage unit 16 at least stores update management information in which information indicating the pieces of software that can be used in the ECUs 40a to 40d is associated with each piece of vehicle identification information (a vehicle ID) for identifying a vehicle, and the update data of the pieces of the software of the ECUs 40a to 40d (or a distribution package including the update data). As the information indicating the software that can be used in the ECUs 40a to 40d, for example, a combination of latest version information of each piece of the software of the ECUs 40a to 40d is defined. Further, as the information on the software update processing, the storage unit 16 can store an update status indicating an update state of the software being executed in the vehicle. In addition, the storage unit 16 can store information (described below) on types of the non-volatile memories mounted on the ECUs 40a to 40d, respectively.

The communication unit 17 functions as a transmission unit and receiving unit that transmits and receives data, information, requests, and the like, to and from the OTA master 30. The communication unit 17 receives an update confirmation request of the software from the OTA master 30 (the receiving unit). The update confirmation request may be, for example, information transmitted from the OTA master 30 to the center 10 at a time when a power supply or an ignition is turned on (hereinafter, referred to as "power supply ON") in the vehicle, and is information for requesting a confirmation, from the center 10, on whether there is update data for the ECUs 40a to 40d based on vehicle configuration information described below. Further, the communication unit 17 transmits information indicating whether there is the update data to the OTA master 30 in response to the update confirmation request received from the OTA master 30 (the transmission unit). Further, the communication unit 17 receives a transmission request (a download request) for the distribution package from the OTA master 30 (the receiving unit). Further, upon receiving the download request for the distribution package, the communication unit 17 transmits, to the OTA master 30, the distribution package (described below) including the update data of the pieces of the software of the ECUs 40a to 40d based on the communication state between the center 10 and the OTA master 30.

When the communication unit 17 receives the update confirmation request from the OTA master 30, the control unit 18 determines, based on the update management information stored in the storage unit 16, whether there is the update data of the pieces of the software of the ECUs 40a to 40d mounted on the vehicle specified by the vehicle ID, which is included in the update confirmation request. The determination result, by the control unit 18, on whether there is the update data is transmitted to the OTA master 30 by the communication unit 17. Upon determining that there is the update data of the pieces of the software of the ECUs 40a to 40d and receiving the download request for the distribution package from the OTA master 30, the control unit 18 controls the update data to be transmitted to the OTA master 30 based on the communication state between the center 10 and the OTA master 30. Further, the control unit 18 generates the distribution package including the update data stored in the storage unit 16 as needed.

(2) In-Vehicle Network

The in-vehicle network 20 includes the OTA master 30, the ECUs 40a to 40d, and a communication module 50. The OTA master 30 is connected to the communication module 50 via a bus 60a, connected to the ECUs 40a, 40b via a bus 60b, and connected to the ECUs 40c, 40d via a bus 60c.

The OTA master 30 can wirelessly communicate with the center 10 via the bus 60a and the communication module 50 by way of the network 70. The OTA master 30 has functions of managing an OTA state and executing the software update for an ECU to be updated (hereinafter, also referred to as a "target ECU") by controlling an update sequence, which is a flow of the software update processing. Based on the update data and the like acquired from the center 10, the OTA master 30 controls the software update for the target ECU from among the ECUs 40a to 40d. The OTA master 30 may also be referred to as a central gateway (CGW).

Figure 4:
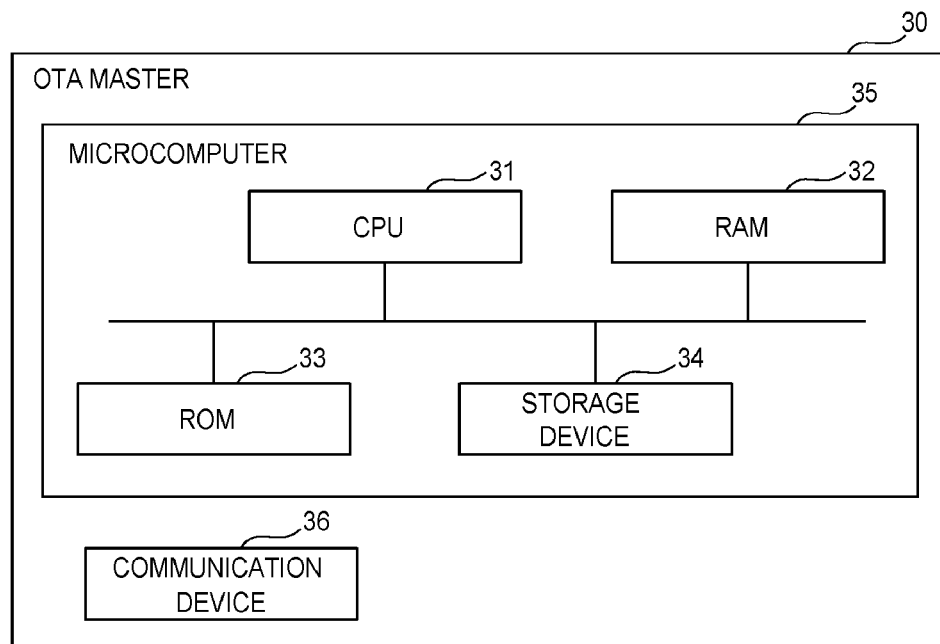
FIG. 4 is a block diagram illustrating a schematic configuration of an OTA master.

FIG. 4 is a block diagram illustrating a schematic configuration of the OTA master 30 in FIG. 1. As illustrated in FIG. 4, the OTA master 30 includes a CPU 31, a RAM 32, a read-only memory (ROM) 33, a storage device 34, and a communication device 36. The CPU 31, the RAM 32, the ROM 33, and the storage device 34 compose a microcomputer 35. The number of the microcomputers 35 is not limited to one. In the OTA master 30, the CPU 31 executes predetermined processing for the software update by executing a program read from the ROM 33 using the RAM 32 as a work area. The communication device 36 is used for communicating with each of the communication module 50 and the ECUs 40a to 40d via the buses 60a to 60c illustrated in FIG. 1.

Figure 5:
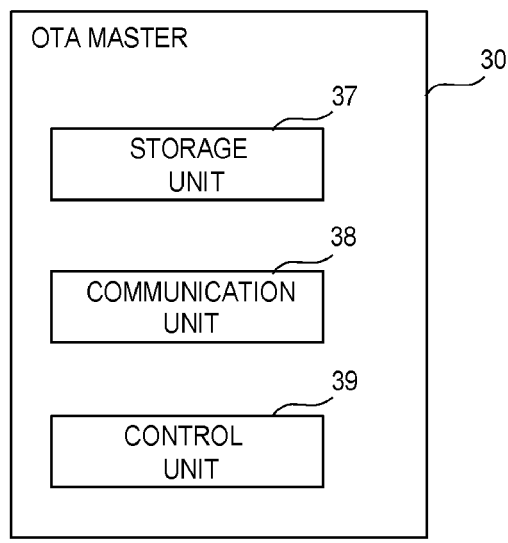
FIG. 5 is a functional block diagram of the OTA master.

FIG. 5 is a functional block diagram of the OTA master 30 illustrated in FIG. 4. The OTA master 30 illustrated in FIG. 5 includes a storage unit 37, a communication unit 38, and a control unit 39. A function of the storage unit 37 is implemented by the storage device 34 illustrated in FIG. 4. Functions of the communication unit 38 and the control unit 39 are implemented when the CPU 31 illustrated in FIG. 4 executes a program stored in the ROM 33 using the RAM 32.

In addition to a program (a control program of the OTA master 30) for updating the pieces of the software of the ECUs 40a to 40d or various pieces of data used when updating the software, the storage unit 37 stores the update data of the software and the like that are downloaded from the center 10. Further, the storage unit 37 can store the information (described below) on the types of the non-volatile memories mounted on the ECUs 40a to 40d, respectively.

The communication unit 38 functions as a transmission unit and receiving unit that transmits and receives data, information, requests, and the like to and from the center 10. The communication unit 38 transmits the update confirmation request of the software to the center 10 at, for example, the time of power supply ON in the vehicle (the transmission unit). The update confirmation request includes, for example, a vehicle ID for identifying the vehicle and the information on the current versions of the pieces of the software of the ECUs 40a to 40d connected to the in-vehicle network 20. The vehicle ID and the current versions of the pieces of the software of the ECUs 40a to 40d are used for determining whether there is the update data of the pieces of the software of the ECUs 40a to 40d by comparing them with the latest software version held by the center 10 for each vehicle ID. Further, as a response to the update confirmation request, the communication unit 38 receives a notification indicating whether there is the update data from the center 10 (the receiving unit). When there is the update data of the pieces of the software of the ECUs 40a to 40d, the communication unit 38 transmits, to the center 10, a download request for the distribution package of the update data of the software (the transmission unit), and receives (downloads), based on the control by the control unit 39, the distribution package transmitted from the center 10 based on the communication state between the center 10 and the OTA master 30 (the receiving unit). Further, the communication unit 38 transmits, to the center 10, the update state of the software transmitted by the ECUs 40a to 40d (the transmission unit).

The control unit 39 determines whether there is the update data of the pieces of the software of the ECUs 40a to 40d based on the response, from the center 10, to the update confirmation request received by the communication unit 38. Further, the control unit 39 verifies, based on its own control, authenticity of the distribution package received (downloaded) by the communication unit 38 from the center 10 and stored in the storage unit 37. Further, the control unit 39 controls the software update processing (various types of verification, the installation, the activation, and the like) for the ECUs 40a to 40d using the update data received (downloaded) from the center 10. Specifically, the control unit 39 transfers one or more pieces of update data downloaded in the distribution package to the target ECU and causes the target ECU to install the update software based on the update data. After the completion of the installation, the control unit 39 gives the target ECU an instruction on activation for making the installed update software active. At the time of executing the software update processing, the control unit 39 appropriately controls procedures of the various types of verification, the installation, the activation, and the like on the ECUs 40a to 40d.

The ECUs 40a to 40d are devices used for controlling an operation of each part of the vehicle. FIG. 1 illustrates an example where the in-vehicle network 20 includes four ECUs 40a to 40d, but the number of ECUs is not particularly limited. For example, the OTA master 30 may be connected to a display device (an HMI) used for executing various displays, such as a display representing that there is the update data at the time of executing software update processing of the ECUs 40a to 40d, a display of an approval request screen for requesting approval for the software update from a user or a manager of the vehicle, and a display of a result of the software update. As the display device, for example, a car navigation system can be used. Further, the number of buses that connect the ECUs to the OTA master 30 is not particularly limited, either. For example, the above-described display device may be connected to the OTA master 30 via a bus other than the buses 60a to 60c.

Figure 6A:
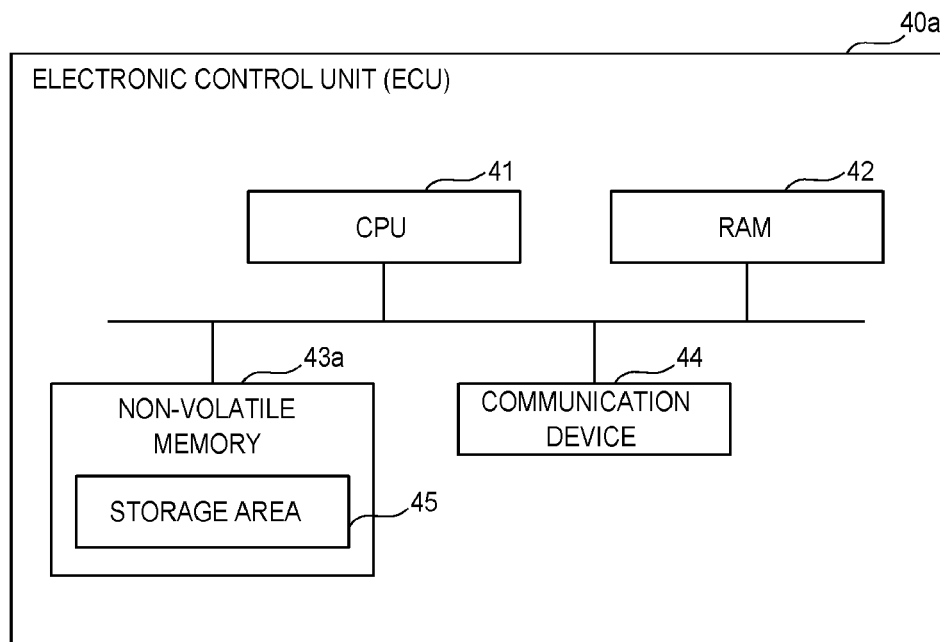
FIG. 6A is a block diagram illustrating an example of a schematic configuration of an electronic control unit.
Figure 6B:
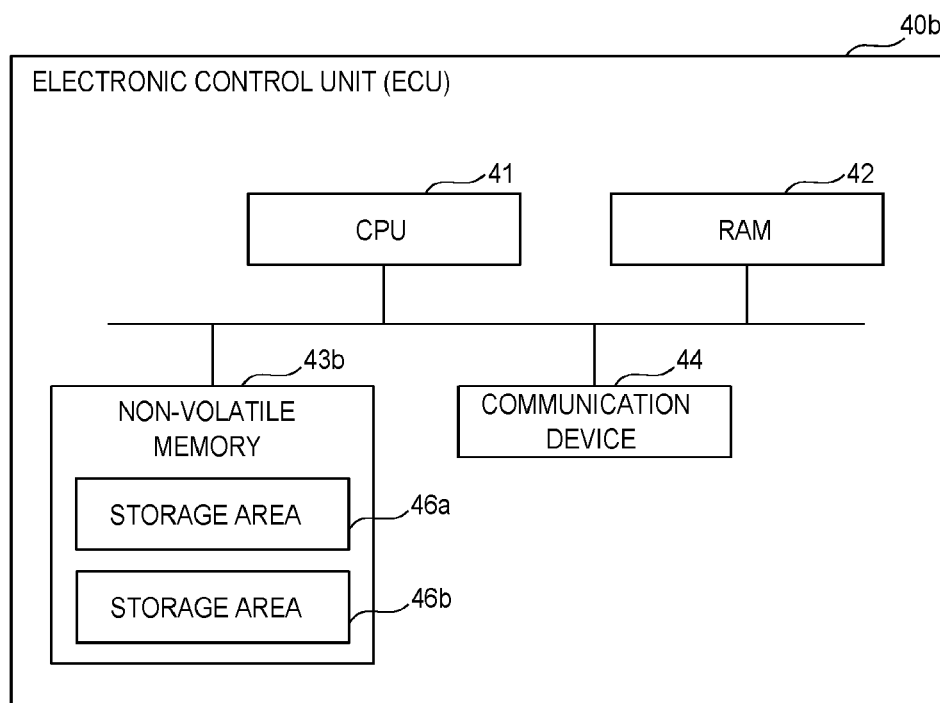
FIG. 6B is a block diagram illustrating another example of the schematic configuration of the electronic control unit.

Each of FIGS. 6A and 6B illustrates an example of a schematic configuration of the ECUs 40a to 40d.

The ECU 40a illustrated in FIG. 6A includes a CPU 41, a RAM 42, a non-volatile memory 43a, and a communication device 44. The CPU 41 implements a function of the ECU 40a by executing the program read from the non-volatile memory 43a using the RAM 42 as a work area. The non-volatile memory 43a is a memory (hereinafter, referred to as a single-bank memory) having one storage area 45 used for storing data, such as software. Hereinafter, a memory type of the non-volatile memory 43a configured to have the one storage area 45 is referred to as a "first type". In the storage area 45, in addition to the software used for implementing the function of the ECU 40a, version information, parameter data, a boot program for booting, a program for updating software, or the like may be stored. The communication device 44 is used for communicating with the OTA master 30 or other ECUs 40b to 40d connected to the in-vehicle network 20.

Similar to the ECU 40a, the ECU 40b illustrated in FIG. 6B includes the CPU 41, the RAM 42, a non-volatile memory 43b, and the communication device 44. However, the non-volatile memory 43b mounted on the ECU 40b is a memory (hereinafter, referred to as a dual-bank memory) having two storage areas 46a, 46b used for storing data, such as software. Hereinafter, a type of the non-volatile memory 43b configured to have the two storage areas 46a, 46b is referred to as a "second type". In the storage areas 46a, 46b, in addition to the software used for implementing the function of the ECU 40b, version information, parameter data, a boot program for booting, a program for updating software, or the like, may be stored. The CPU 41 of the ECU 40b uses any one of the two storage areas 46a, 46b included in the non-volatile memory 43b as the storage area (an active bank) to be read, and executes software stored in the storage area to be read. On the other storage area (an inactive bank, a write bank) that is not to be read, the update software (an updated version program) can be installed (written) based on the update data on the background while the program in the storage area (the active bank) to be read is being executed. In the software update processing, at the time of executing the activation (making the update software active), the update software can be activated by switching the storage area from which the program is read by the CPU 41 of the ECU 40b.

As a specific example, it is assumed that current software is stored in the storage area 46a of the non-volatile memory 43b, which is the dual-bank memory, and the update software is installed in the storage area 46b. For example, upon receiving an instruction on activating the update software from the OTA master 30, the ECU 40b can switch the storage area (the active bank) to be read of the CPU 41 by switching a read start address of the CPU 41 from a head address of the storage area 46a to a head address of the storage area 46b, and can execute the update software installed in the storage area 46b. In the present disclosure, a configuration referred to as a "single-bank suspension memory" in which one storage area is pseudo-divided into two banks and software (a program) can be written on the one bank while the program stored on the other bank is being executed is also classified into the second-type memory.

FIG. 7 illustrates an example of the type information on the type of the non-volatile memory mounted on each of the ECUs 40a to 40d. In the type information exemplified in FIG. 7, an ECU JD, which is a number used for identifying the ECU, is associated with the type (the first type (the single-bank)/the second type (the dual-bank)) of the non-volatile memory mounted on the ECU. The type information is stored and managed in one or both of the storage unit 37 of the OTA master 30 and the storage unit 16 of the center 10. The type information may be generated in advance based on specifications of the ECUs 40a to 40d composing the in-vehicle network 20 and stored in the storage unit 37 of the OTA master 30 at the time of manufacturing and the like of the vehicle. Alternatively, the type information may be acquired by the OTA master 30 from the target ECU by communication inside the in-vehicle network 20 at the time of executing the software update processing. Alternatively, when the type information is managed by the center 10, the OTA master 30 may acquire the type information from the center 10 via the network 70.

The communication module 50 is a unit having a function of controlling communication between the center 10 and the vehicle, and is a communication device used for connecting the in-vehicle network 20 to the center 10. The communication module 50 is wirelessly connected to the center 10 by way of the network 70, and the OTA master 30 executes authentication of the vehicle, the download of the update data, or the like. The communication module 50 may be included in the OTA master 30.

Overview of Software Update Processing

At, for example, the time of the power supply ON in the vehicle, the OTA master 30 transmits the update confirmation request of the software to the center 10. The update confirmation request includes a vehicle ID used for identifying the vehicle and vehicle configuration information, which is information on a state of an ECU (a system configuration), such as current versions of pieces of hardware and the pieces of the software of the ECUs 40a to 40d connected to the in-vehicle network 20. The vehicle configuration information can be generated by acquiring identification numbers (ECU_ID) of the ECUs and identification numbers of the software versions (ECU_Software_ID) of the ECUs from the ECUs 40a to 40d connected to the in-vehicle network 20. The vehicle ID and the current versions of the pieces of the software of the ECUs 40a to 40d are used for determining whether there is the update data of the pieces of the software of the ECUs 40a to 40d by comparing them with the latest software version held by the center 10 for each vehicle ID. As a response to the update confirmation request received from the OTA master 30, the center 10 transmits a notification indicating whether there is the update data to the OTA master 30. When there is the update data of the pieces of the software of the ECUs 40a to 40d, the OTA master 30 transmits, to the center 10, the download request for the distribution package. In response to the download request received from the OTA master 30, the center 10 transmits, to the OTA master 30, the distribution package (described below) including the update data based on the communication state between the center 10 and the OTA master 30. In addition to the update data, the distribution package may include verification data for verifying the authenticity of the update data, the number of pieces of update data, type information, various pieces of control information used at the time of the software update, or the like.

The OTA master 30 determines whether there is the update data of the pieces of the software of the ECUs 40a to 40d based on the response to the update confirmation request received from the center 10. Further, the OTA master 30 verifies the authenticity of the distribution package received from the center 10 and stored in the storage device 13 based on the communication state between the center 10 and the OTA master 30. Further, the OTA master 30 transfers one or more pieces of update data downloaded in the distribution package to the target ECU and causes the target ECU to install the update data. After the completion of the installation, the OTA master 30 gives the target ECU an instruction on activation for making the installed updated version software active.

Further, in approval request processing, the OTA master 30 causes an output device to output a notification indicating that the approval for the software update is required or a notification prompting an input indicating that the software update has been approved. As the output device, a display device (not shown), provided on the in-vehicle network 20 and outputting a notification by a display, a voice output device (not shown) that outputs a notification by voice, or the like, can be used. For example, in the approval request processing, when the display device is used as the output device, the OTA master 30 can cause the display device to display an approval request screen used for requesting the approval for the software update from the user or the manager, or cause the display device to display a notification prompting a specific input operation, such as pressing of an approval button when the user or the manager approves the request. Alternatively, in the approval request processing, the OTA master 30 can cause the display device to display text, an icon, or the like, notifying that there is the update data of the pieces of the software of the ECUs 40a to 40d, or cause the display device to display restrictions and the like during the execution of the software update processing. Upon receiving the input indicating that the request has been approved from the user or the manager, the OTA master 30 executes control processing of the above-described installation and activation, and updates the software of the target ECU.

Here, when the non-volatile memory of the target ECU is the single-bank memory, in principle, approval request processing for the software update is executed before the execution of the installation because the installation and the activation are consecutively executed. Even for the target ECU of the single-bank memory, it can be required that the update processing be temporarily stopped in a state where the installation is in completed, that is, the activation be on stand-by (suspended). Further, when the non-volatile memory of the target ECU is the dual-bank memory, the approval request processing for the software update is executed at least after the execution of the installation and before the execution of the activation. When the non-volatile memory of the target ECU is the dual-bank memory, the approval request processing for the software update before the execution of the installation may be executed or omitted.

The software update processing is composed of a phase in which the OTA master 30 downloads the update data from the center 10 (a download phase), a phase in which the OTA master 30 transfers the downloaded update data to the target ECU and installs the update software based on the update data on the storage area of the target ECU (an installation phase), and a phase in which the target ECU makes the installed update software active (an activation phase).

The download is processing in which the OTA master 30 receives the update data that is used for updating the software of the ECU and that is transmitted from the center 10, and stores it in the storage unit 37. In the download, the download of the update data for the ECU having the dual-bank memory mounted thereon and the update data for the ECU having the single-bank memory mounted thereon is executed based on the communication state between the center 10 and the OTA master 30, using a predetermined distribution package described below. The download phase includes not only the execution of the download, but also controls of a series of processes associated with the download, such as determining whether the download can be executed and verifying the update data.

The update data transmitted from the center 10 to the OTA master 30 may include any of the update software of the ECU (total data or difference data), the compressed data obtained by compressing the update software, and the divided data obtained by dividing the update software or the compressed data. Further, the update data may include the ECU_ID of the target ECU (or the serial number) and an ECU_Software_ID of the target ECU before the update. The downloaded distribution package can include the update data only for a single ECU or update data for a plurality of ECUs.

The installation is processing in which the OTA master 30 writes, according to a determined procedure, the update software (the updated version program) on the non-volatile memory 43a and/or the non-volatile memory 43b of a plurality of target ECUs according to the communication state between the center 10 and the OTA master 30, based on the update data downloaded from the center 10. The installation may be executed with prioritizing any one of the update data for the ECU having the dual-bank memory mounted thereon and the update data for the ECU having the single-bank memory mounted thereon, or may be executed without prioritizing any of them. The installation phase includes not only the execution of the installation, but also controls of a series of processes associated with the installation, such as determining whether the installation can be executed, transferring the update data, and verifying the update software.

When the update data includes the update software itself (the total data), in the installation phase, the OTA master 30 transfers the update data (the update software) to the target ECU. Further, when the update data includes the compressed data, the difference data, or the divided data of the update software, the OTA master 30 may transfer the update data to the target ECU and the target ECU may generate the update software from the update data, or the OTA master 30 may generate the update software from the update data and then transfer the update software to the target ECU. Here, the update software can be generated by decompressing the compressed data or assembling (integrating) the difference data or the divided data.

The update software can be installed by the target ECU based on a request for the installation from the OTA master 30. A specific target ECU that has received the update data may autonomously execute the installation without receiving an explicit instruction from the OTA master 30.

The activation is processing in which the target ECU makes (activates) the update software installed on the non-volatile memory 43a and/or the non-volatile memory 43b active. The activation may be executed with prioritizing any one of the update data for the ECU having the dual-bank memory mounted thereon and the update data for the ECU having the single-bank memory mounted thereon, or may be executed without prioritizing any of them. The activation phase includes not only the execution of the activation but also controls of a series of processes associated with the activation, such as determining whether the activation can be executed, an approval request for the activation to the user or the manager of the vehicle, and verifying the execution result.

The update software can be activated by the target ECU based on a request for the activation from the OTA master 30. A specific target ECU that has received the update data may autonomously execute the activation after the completion of the installation without receiving an explicit instruction from the OTA master 30.

The software update processing can be executed continuously or in parallel to each of the target ECUs.

Further, the "software update processing" in the present specification includes not only processing for continuously executing all of the download, installation, and activation, but also processing for executing only a part of the download, installation, and activation.

Processing

Next, specific examples of software update processing executed in the network system according to the present embodiment will be described with further reference to FIGS. 8, 9, and 10.

(1) Specific Example of Download

Figure 8:
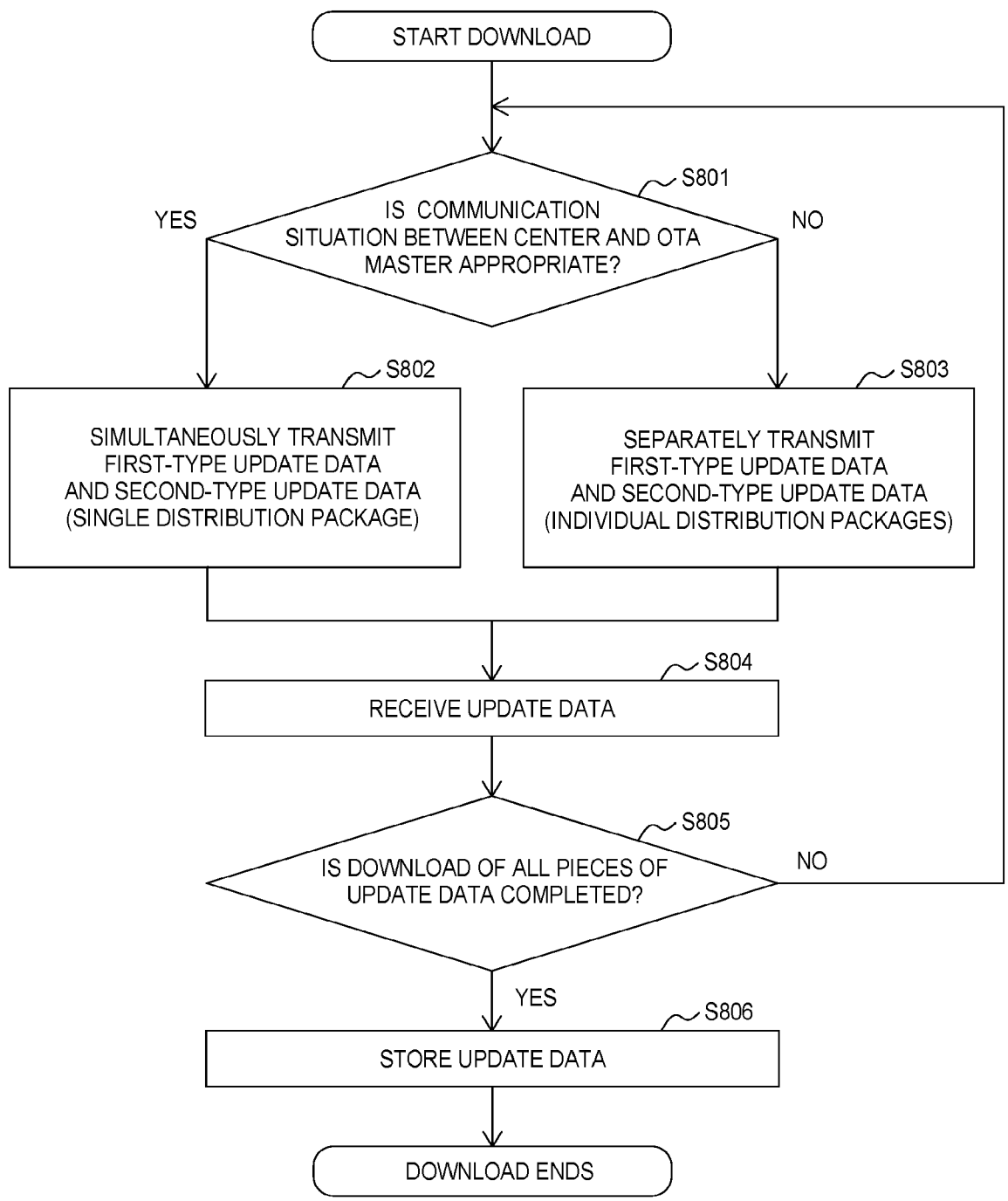
FIG. 8 is an example of a flowchart of download processing procedures executed by the center and the OTA master.

FIG. 8 is a flowchart describing download processing procedures according to specific examples executed by the center 10 and the OTA master 30. The download processing exemplified in FIG. 8 is started when the center 10 receives a download request for the distribution package from the OTA master 30.

(Step S801) The center 10 determines whether the communication state between the center 10 and the OTA master 30 is appropriate. The communication state can be determined based on, for example, an execution state (availability of a communication band or a state of a communication load) of an application that executes communication control between the center 10 and the vehicle. As an example, when there is availability equal to or higher than a predetermined value in the communication band or when the communication load is lower than the predetermined value, it can be defined that the communication state is appropriate. This predetermined value can be arbitrarily set in consideration of a size of update data, a communication environment implemented by the vehicle, a time limit of the software update, and the like, based on a determination on whether a state is desirable for selecting an individual distribution package described below. When the communication state between the center 10 and the OTA master 30 is appropriate (step S801, YES), the process proceeds to step S802. On the other hand, when the communication state between the center 10 and the OTA master 30 is not appropriate (step S801, NO), the process proceeds to step S803.

(Step S802) The center 10 simultaneously transmits, to the OTA master 30, update data (hereinafter, referred to as "first-type update data") for a target ECU having a first-type non-volatile memory (the single-bank memory) mounted thereon and update data (hereinafter, referred to as "second-type update data") for a target ECU having a second-type non-volatile memory (the dual-bank memory) mounted thereon from among the target ECUs of which software is to be updated. The first-type update data and the second-type update data can be simultaneously transmitted by transmitting a single distribution package in which both the first-type update data and the second-type update data are packaged. The center 10 may generate a single distribution package based on update data acquired from a vehicle manufacturer (an OEM), or may acquire a single distribution package generated by the vehicle manufacturer and use it as it is. A single distribution package in which the first-type update data and the second-type update data are mixed may be divided into a plurality of distribution packages for each ECU and generated. When the center 10 simultaneously transmits the first-type update data and the second-type update data, the process proceeds to step S804.

(Step S803) The center 10 separately transmits the first-type update data and the second-type update data to the OTA master 30. The first-type update data and the second-type update data can be separately transmitted by separately transmitting each of a distribution package (an individual distribution package) in which only the first-type update data is packaged and a distribution package (an individual distribution package) in which only the second-type update data is packaged. As a transmission method, for example, the center 10 first transmits the individual distribution package of the second-type update data, which has a relatively low probability of update failure, and continuously transmits the individual distribution package of the first-type update data. The center 10 may generate the individual distribution packages based on the update data acquired from a vehicle manufacturer (the OEM), or may acquire the individual distribution packages generated by the vehicle manufacturer and use them as they are. Further, upon acquiring the update data in the form of a single distribution package from the vehicle manufacturer, the center 10 newly generates an individual distribution package of the first-type update data and an individual distribution package of the second-type update data. Further, the center 10 may divide the individual distribution package including a plurality of pieces of update data generated by the vehicle manufacturer into a plurality of packages for, for example, respective target ECUs. The center 10 can refer to the type information stored in the storage unit 16 and determine the memory type of the non-volatile memory mounted on the target ECU. When the center 10 separately transmits the first-type update data and the second-type update data, the process proceeds to step S804.

(Step S804) The OTA master 30 receives the update data transmitted in the distribution package from the center 10. When the communication state between the center 10 and the OTA master 30 is appropriate, the OTA master 30 can simultaneously receive the first-type update data and the second-type update data in a single distribution package by download processing from the center 10. On the other hand, when the communication state between the center 10 and the OTA master 30 is not appropriate, the OTA master 30 can separately receive the first-type update data and the second-type update data in individual distribution packages by the download processing from the center 10. When the distribution package transmitted from the center 10 is received, the process proceeds to step S805.

(Step S805) The OTA master 30 determines whether the download of all pieces of update data (the first-type update data/the second-type update data) transmitted from the center 10 is completed. The completion of the download of all pieces of update data can be determined by whether all pieces of update data requested to the center 10 using the download request have been received. When the download of all pieces of update data is completed (step S805, YES), the process proceeds to step S806. On the other hand, when the download of all pieces of update data is not completed (step S806, NO), the process proceeds to step S801.

(Step S806) The OTA master 30 stores the pieces of update data, respectively received in the distribution packages from the center 10, in the storage unit 37. As such, the download processing ends.

With the specific example of the download, the center 10 and the OTA master 30 can download update data appropriate for the software update for each target ECU based on the communication state between the center 10 and the OTA master 30.

In the above specific example, a control in which the center 10 side determines the communication state between the center 10 and the OTA master 30 and transmits any one of a single distribution package and individual distribution packages to the OTA master 30 has been described. On the other hand, a control may be executed such that the OTA master 30 side determines the communication state between the center 10 and the OTA master 30 and receives an appropriate distribution package by transmitting the download request for any one of a single distribution package and individual distribution packages to the center 10.

(2) Specific Example of Installation

Figure 9:
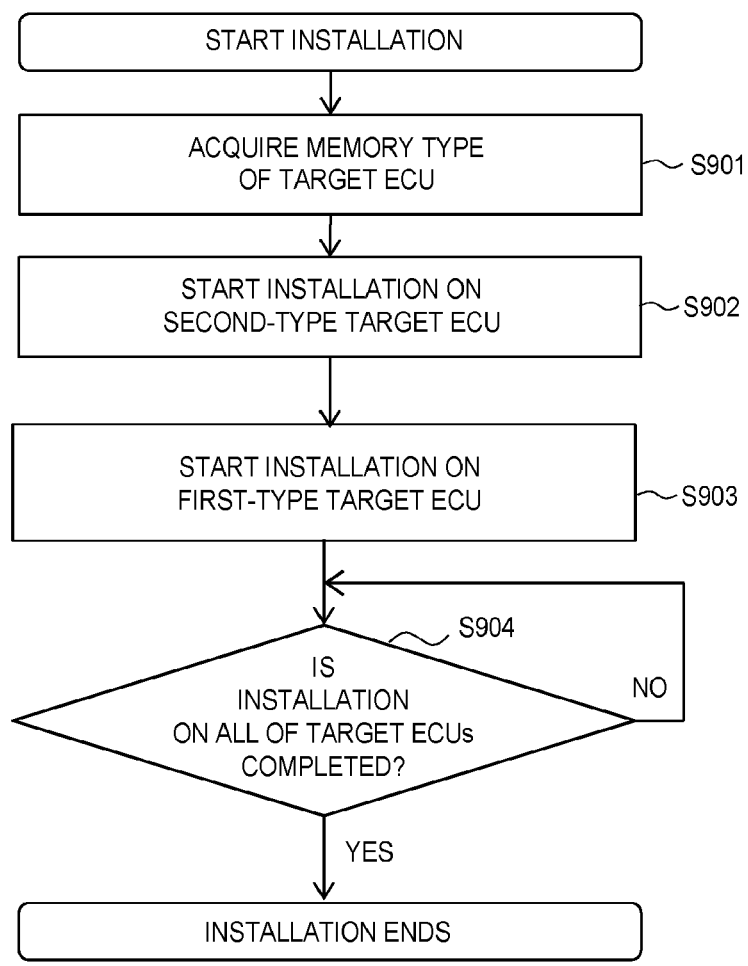
FIG. 9 is an example of a flowchart of installation processing procedures executed by the OTA master and a target electronic control unit.

FIG. 9 is a flowchart describing installation processing procedures according to a specific example executed by the OTA master 30 and the target ECU. The specific example of the installation exemplified in FIG. 9 is started after the download of at least one piece of second-type update data is completed and when predetermined conditions (whether the installation can be executed, OK in verification of the update data verification, and the like) are satisfied.

(Step S901) The OTA master 30 acquires the memory type (the first-type non-volatile memory/the second-type non-volatile memory) of the non-volatile memory mounted on the target ECU. This memory type can be acquired by referring to the type information (FIG. 7) stored in the storage unit 37 when the OTA master 30 manages the memory type, and can be acquired by referring to the information of the memory type that is included in the distribution package and transmitted when the center 10 manages the memory type. When the memory type of the target ECU is acquired, the process proceeds to step S902.

(Step S902) The OTA master 30 and the second-type target ECU start the installation, which is processing for writing the update software on the storage area of the non-volatile memory of the second-type target ECU, based on the update data. The installation is started all at once or in a predetermined order on all of the second-type target ECUs. When the installation on the second-type target ECU is started, the process proceeds to step S903.

(Step S903) The OTA master 30 and the first-type target ECU start the installation, which is processing for writing the update software on the storage area of the non-volatile memory of the first-type target ECU, based on the update data. The installation is started all at once or in a predetermined order on all of the first-type target ECUs. The installation on the first-type target ECU may be started after the installation on all of the second-type target ECUs is completed or after the installation on some second-type target ECUs, determined in advance, is completed. When the installation on the first-type target ECU is started, the process proceeds to step S904.

(Step S904) The OTA master 30 determines whether the installation of of the update software on all of target ECUs (including the first-type target ECUs and the second-type target ECUs) is completed. The OTA master 30 may determine the completion of the installation based on a completion notification from each target ECU or after a predetermined time has elapsed from the start of the installation. The predetermined time can be set, for example, to be equal to or longer than a maximum time needed for each installation. When the OTA master 30 determines that the installation of the update software on all of the target ECUs is completed (step S904, YES), the installation on the target ECUs is completed and this installation processing ends.

With the specific example of the installation, it is possible to start the installation with prioritizing the installation on the second-type target ECU, which does not require a stop control during the update, over the installation on the first-type target ECU, which requires the stop control during the update. By this processing, it is possible to reduce the communication load inside the vehicle (the in-vehicle network 20) and shorten a time during which the control of the vehicle should be stopped until the writing of all the update software is completed.

(3) Specific Example of Activation

Figure 10:
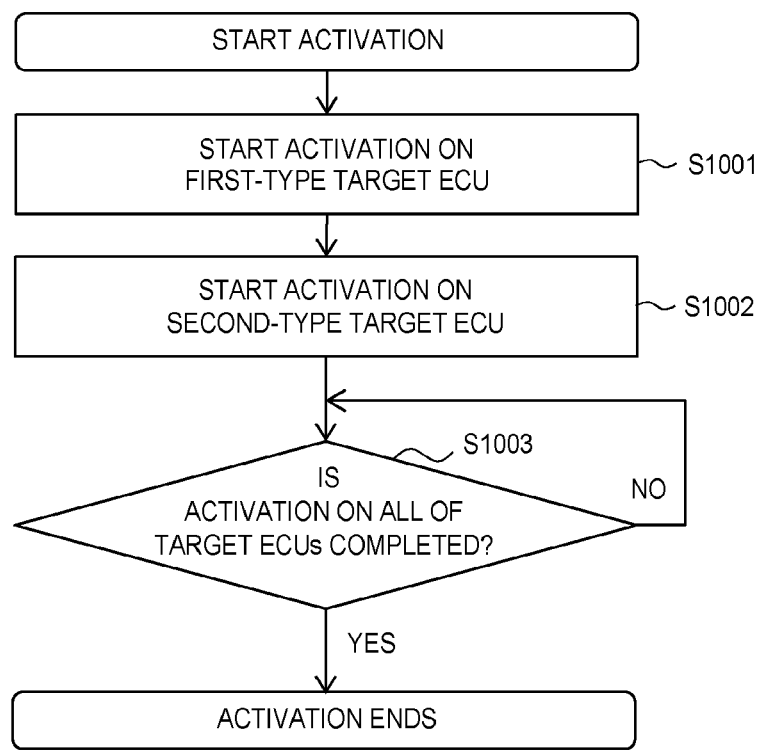
FIG. 10 is an example of a flowchart of activation processing procedures executed by the OTA master and the target electronic control unit.

FIG. 10 is a flowchart describing activation processing procedures according to a specific example executed by the OTA master 30 and the target ECU. The activation processing exemplified in FIG. 10 is started after the installation of the update software on the first-type target ECU and the second-type target ECU are completed, respectively, and when predetermined conditions (whether the activation can be executed, OK in the verification of the update data, and the like) are satisfied.

(Step S1001) The OTA master 30 and the first-type target ECU start the activation, which is processing for making the update software written on the storage area of the non-volatile memory of the first-type target ECU active. The activation is started all at once or in a predetermined order on all of the first-type target ECUs. When the activation of the update software on the first-type target ECU is started, the process proceeds to step S1002.

(Step S1002) The OTA master 30 and the second-type target ECU start the activation, which is processing for making the update software written on the storage area of the non-volatile memory of the second-type target ECU active.

The activation is started all at once or in a predetermined order on all of the second-type target ECUs. The activation on the second-type target ECU may be started after the activation on all of the first-type target ECUs is completed or after the activation on some first-type target ECUs, determined in advance, is completed. When the activation of the update software on the second-type target ECU is started, the process proceeds to step S1003.

(Step S1003) The OTA master 30 determines whether the activation of the update software on all of the target ECUs (including the first-type target ECUs and the second-type target ECUs) is completed. The OTA master 30 may determine the completion of the activation based on a completion notification from each type target ECU or after a predetermined time has elapsed from the start of the activation. The predetermined time can be set, for example, to be equal to or longer than a maximum time needed for each activation. When it is determined that the activation of the update software on all of the target ECUs is completed (step S1003, YES), the activation on the target ECUs is completed and this activation processing ends.

With the specific example of the activation, the activation of the update software on the first-type target ECU is first started, and then the activation of the update software on the second-type target ECU is started. By this processing, the software update for the second-type target ECU can be executed after success of the software update for the first-type target ECU is confirmed, and thus it is possible to appropriately execute the software update processing for the system including the configurations of both the target ECU having the single-bank memory mounted thereon and the target ECU having the dual-bank memory mounted thereon.

Action and Advantageous Effect

As described above, with the network system according to one embodiment of the present disclosure, a method of downloading the update data for the ECU having the single-bank memory (the first-type non-volatile memory) mounted thereon and the update data for the ECU having the dual-bank memory (the second-type non-volatile memory) mounted thereon between the center and the OTA master is appropriately controlled based on the communication state between the center and the OTA master.

By this processing, it is possible to appropriately transmit and receive update data based on the communication state between the center and the vehicle. Accordingly, it is possible to reduce a time required for normally starting the ECU after the software update.

More specifically, when the communication load between the center and the OTA master is lower than the predetermined value, control for receiving the update data (the first-type update data) for the ECU having the single-bank memory mounted thereon and the update data (the second-type update data) for the ECU having the dual-bank memory mounted thereon in a single distribution package is executed. On the other hand, when the communication load between the center and the OTA master is equal to or higher than the predetermined value, control for receiving the update data for the ECU having the single-bank memory mounted thereon and the update data for the ECU having the dual-bank memory mounted thereon in individual distribution packages is executed.

By this processing, when the communication load between the center and the vehicle is low, the update data for the ECU having the single-bank memory mounted thereon and the update data for the ECU having the dual-bank memory mounted thereon can be simultaneously downloaded. Thus, it is possible to proceed with the processing after the download without delay.

As above, one embodiment of the present disclosure has been described, but the present disclosure can be regarded not only as a center, but also as a method executed by the center including one or more processors and one or more memories, a program, a computer-readable non-transitory storage medium storing the program, an OTA master communicable with the center, a system including the center and the OTA master, a vehicle including the OTA master, or the like.

It is possible to use the technology of the present disclosure in a network system used for updating software of an ECU.

What is claimed is:

1. A method executed by a center configured to communicate with an over-the-air (OTA) master that includes one or more processors and one or more memories and is configured to control, based on update data, a software update for a plurality of electronic control units mounted on a vehicle, the method comprising:
   transmitting, to the OTA master, first-type update data that is the update data for a first electronic control unit on which a first-type non-volatile memory having one storage area is mounted and second-type update data that is the update data for a second electronic control unit on which a second-type non-volatile memory having two storage areas is mounted, the first electronic control unit and the second electronic control unit being included in the electronic control units;
   controlling transmittance of the first-type update data and the second-type update data to the OTA master based on a communication state between the center and the OTA master;
   transmitting, when a communication load between the center and the OTA master is lower than a predetermined value, a distribution package including the first-type update data and the second-type update data; and
   transmitting, when the communication load between the center and the OTA master is equal to or higher than the predetermined value, a first distribution package including the first-type update data and a second distribution package including the second-type update data to the OTA master separately.

2. A non-transitory storage medium storing instructions that are executable by a computer of the center configured to communicate with the over-the-air (OTA) master which includes the one or more processors and the one or more memories and is configured to control the software update of the electronic control units mounted on the vehicle, and that cause the computer to execute the method according to claim 1.

3. A center comprising:
   one or more processors configured to:
      communicate with an over-the-air (OTA) master configured to control, based on update data, a software update for a plurality of electronic control units mounted on a vehicle;
      transmit, to the OTA master, first-type update data that is the update data for a first electronic control unit on which a first-type non-volatile memory having one storage area is mounted and second-type update data that is the update data for a second electronic control unit on which a second-type non-volatile memory having two storage areas is mounted, the first electronic control unit and the second electronic control unit being included in the electronic control units;

control transmittance of the first-type update data and the second-type update data to the OTA master based on a communication state between the center and the OTA master;

transmit, when a communication load between the center and the OTA master is lower than a predetermined value, a distribution package including the first-type update data and the second-type update data to the OTA master; and transmit, when the communication load between the center and the OTA master is equal to or higher than the predetermined value, a first distribution package including the first-type update data and a second distribution package including the second-type update data to the OTA master separately.

4. An over-the-air (OTA) master comprising:
one or more processors configured to:
receive, from a center, first-type update data for a first electronic control unit on which a first-type non-volatile memory having one storage area is mounted and second-type update data for a second electronic control unit on which a second-type non-volatile memory having two storage areas is mounted, the first electronic control unit and the second electronic control unit being included in a plurality of electronic control units mounted on a vehicle, and the first-type update data and the second-type update data being update data based on which software update for the electronic control units is controlled;

control reception of the first-type update data and the second-type update data from the center based on a communication state between the center and the OTA master;

request, when a communication load between the center and the OTA master is lower than a predetermined value, the center to transmit a distribution package including the first-type update data and the second-type update data; and request, when the communication load between the center and the OTA master is equal to or higher than the predetermined value, the center to transmit a first distribution package including the first-type update data and a second distribution package including the second-type update data separately.

5. A vehicle comprising:
the OTA master according to claim 4.

6. A system comprising:
an over-the-air (OTA) master including one or more first processors configured to control, based on update data, a software update for a plurality of electronic control units mounted on a vehicle; and a center including one or more second processors configured to
communicate with the OTA master,
transmit, to the OTA master, first-type update data that is the update data for a first electronic control unit on which a first-type non-volatile memory having one storage area is mounted and second-type update data that is the update data for a second electronic control unit on which a second-type non-volatile memory having two storage areas is mounted, the first electronic control unit and the second electronic control unit being included in the electronic control units, control transmittance of the first-type update data and the second-type update data to the OTA master based on a communication state between the center and the OTA master, transmit, when a communication load between the center and the OTA master is lower than a predetermined value, a distribution package including the first-type update data and the second-type update data; and transmit, when the communication load between the center and the OTA master is equal to or higher than the predetermined value, a first distribution package including the first-type update data and a second distribution package including the second-type update data to the OTA master separately, wherein the one or more first processors are configured to receive the first-type update data and the second-type update data transmitted by the center.

* * * * *